United States Patent [19]

Hansen et al.

[11] 3,761,954

[45] Sept. 25, 1973

[54] STYLUS

[75] Inventors: Richard C. Hansen, Penfield; Ved K. Gulati, Rochester, both of N.Y.

[73] Assignee: Xerox Corporation, Stamford, Conn.

[22] Filed: Oct. 6, 1971

[21] Appl. No.: 187,032

[52] U.S. Cl. ............................ 346/139 C, 346/74 SB
[51] Int. Cl. ............................................. G01d 15/06
[58] Field of Search ...................... 346/139 C, 74 E, 346/74 ES, 74 CH, 74 SB

[56] References Cited
UNITED STATES PATENTS
2,719,775  10/1955  Erving .......................... 346/139 C
2,928,708  3/1960  Ellison et al. .................. 346/74 CH
3,018,153  1/1962  Steen .............................. 346/139 C
3,204,249  8/1965  Shaler et al. ................... 346/139 C
3,317,917  5/1967  Little et al. ..................... 346/139 C Primary Examiner—Joseph W. Hartary
Attorney—James J. Ralabate et al.

[57] ABSTRACT

A stylus which includes a conductive blank and at least three conductive wires soldered onto the blank to form the writing tip of the stylus. The wires are placed parallel to each other and the tip ends thereof are so aligned that they form a line transverse to the direction of the travel of the stylus as it travels over a recording medium. The wires are preferably bonded to each other and held in a predetermined spatial relationship by a cured epoxy resin.

5 Claims, 6 Drawing Figures

Patented Sept. 25, 1973 3,761,954

INVENTORS.
RICHARD C. HANSEN
VED K. GULATI
BY

*Sang Ki Lee*
ATTORNEY

STYLUS

This invention relates to styli and, more particularly, improved styli for use in facsimile apparatus.

In facsimile systems, graphic information in the form of photographic pictures or letters are scanned and converted into electrical signals for transmission over a transmission path, such as voice band telephone transmission line, and received and recorded on papers in the form of facsimiles of the original by the styli of the facsimile apparatus. Papers used for such systems usually include thin electro-resistive layers or coats of material usually of white color over a layer of colored conductive composition, for example, of carbon black material. The electrical signal currents are applied to the electro-resistive layer, through a blank and a single wire bonded onto the blank forming the writing tip of the styli, to burn off and evaporate the portion of the electro-resistive layer in contact with the writing tip. In this manner portions of the blank layer are exposed and the composite of the blank layers so exposed are patterned to form the facsimile of the originals.

In such a system, the stylus typically scan or track from 64 and 96 lines per inch for a 8.5 by 11 inches paper over a 4 and 6 minute time interval respectively, or 704 lines and 1,056 line per copy sheet. Thus, the stylus is subjected to heavy mechanical wear and tear, which adversely affect its useful life span and the restoration of the facsimile image found. An approach to reduce the wear and tear might be to use the stylus pen with an enlarged tip area of the single wire structure so that a less number of scans needs to be made in making a facsimile copy. Such an approach is not without a limit, however, because of other limitations imposed on the facsimile systems. For example, there is a limit as to maximum size of a discrete point that can be quantized into electrical signals and received and recorded without losing the resolution or information of the scanned line. This limits the effective cross-sectional area of the tip of the stylus coming in contact with the paper.

It is an object of the present invention to provide an improved stylus for use in the facsimile apparatus generally, and more specifically, an improved stylus which gives better resolution and extends useful life span of the stylus.

These and other objects of the present invention are achieved by using three or more wires bonded onto the stylus blank with their tips aligned transverse to the writing direction. Another feature of the invention resides in dipping the wires in an epoxy, except the tip ends thereof, so that the physical integrity of the spacing between the wires is rigidly maintained during the useful life span of the stylus.

The foregoing and other objects and features of the present invention will be more clearly understood from the following detailed description of the preferred embodiments in conjunction with the drawings in which.

DETAILED DESCRIPTION OF THE PREFERRED EMBODIMENT

Figure 1:
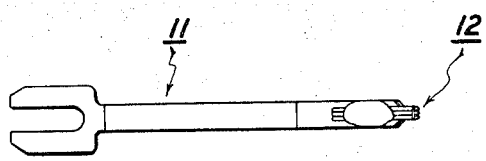
FIG. 1 is a top view of a stylus with three parallel wires forming the writing tip of the stylus.
Figure 2:
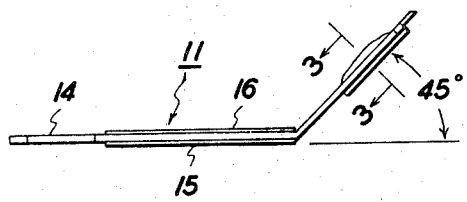
FIG. 2 is a side view of the stylus of FIG. 1.
Figure 4:
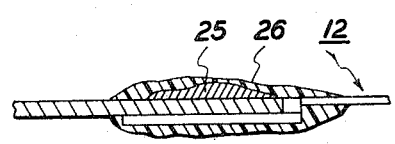
FIG. 4 is an enlarged fragmentary longitudinal section of the stylus show solder bonding of the wires to the blank and epoxy layer which holds the wires together and maintain their spatial relationship.

As shown in FIGS. 1 and 2, a stylus according to the invention comprises a blank or strip portion 11 and writing tip portion 12. The blank 11 is made of a relatively thin strip of conductive material, such as copper or silver, as generally shown in FIGS. 1–4. The blank may include a main strip 14 and a pair of thin foil strips 15 and 16 sandwiching the main strip to control the damping characteristics of the stylus as it rides on the facsimile paper. It was found advantageous to adhesively bond the foil strips to the main strip. For this reason, foil strips with rubber based adhesive coat were used. One end, say, the inner end of the main strip is bifurcated as shown to facilitate mounting. The electrical signal current can be applied to the stylus. The other or outer end of the main strip 14 is bent at an angle as shown in FIG. 2, between 42° to 48° to orient the stylus for engaging against the paper.

Figure 3:
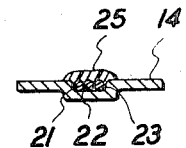
FIG. 3 is a cross section taken along the line 3—3 in FIG. 2 shows the writing wires solder bonded onto a channel in the blank.

As shown in FIG. 3, the outer end of the main strip 14 of the blank 11 is provided with a longitudinal channel to receive the wires used as the writing tip of the stylus. These wires are mechanically bonded onto the strip using a conventional soldering technique. As shown in FIGS. 1 and 3, three wires 21, 22, and 23 of about 5 mils diameter each were used to form the writing tip portion 12. It was found that drawn iridium wires are especially suitable in that iridium is not only a good conductor but also highly resistant to corrosion due to the arcing and other atmospheric conditions that the tip is subject to in actual use.

The wires 21, 22, 23 are positioned in parallel to one another with their tips aligned in a line transverse to the direction of the travel of the pen and are spaced from one another about 1 mil. To prevent the wires 21–23 from spreading as they ride on the facsimile paper, a cured epoxy resin is advantageously employed to maintain their spacial integrity. To that end, after the wires 21–23 have been spaced and positioned in the manner described above, all but the tips thereof are dipped into a clear epoxy resin (such as the commerical epoxy sold under the name TRA-CAST 3012 by TRA-CAM Corporation, Medford, Mass.). Suitably, an epoxy coating of about 4 to 10 mils is formed on both sides of the wires 21–23. After curing, the epoxy coating ensures that the resolution of the facsimile image produced by the stylus is maintained with a predetermined and preset range, even after the stylus has been used for a long period of time.

Figure 5:
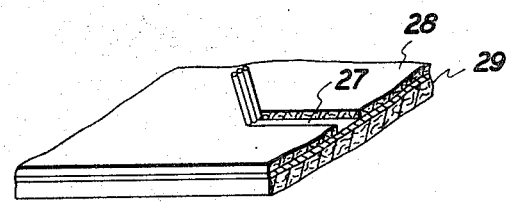
FIG. 5 shows the writing tip of the stylus formed by the wires and a section of copy paper to show writing operation of the stylus.
Figure 6:
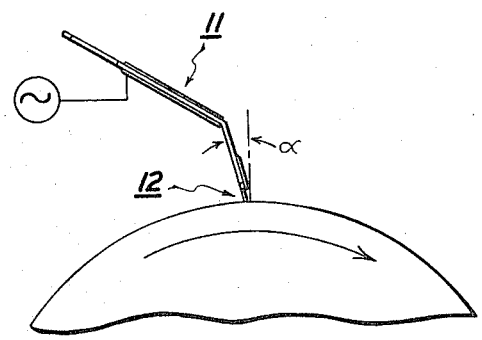
FIG. 6 shows the preferred position of the stylus, especially the writing tip, with respect to the surface of the facsimile paper.

As shown in FIGS. 5 and 6, an optimal resolution of the facsimile image is be obtained by placing the wires onto the writing paper at an angle of between 13° to 17° from the normal to surface of the paper. Such positioning appears to enable the stylus of the aforedescribed structure to provide a good, electrical and mechanical contact with the paper and burn off and evaporate the portion 28 of the coated electroresistive layer under the writing tip and expose a portion 27 of another layer made of a black carbon composition material in accordance with the current pattern of the electrical signals received by the facsimile receiver and applied to the stylus.

While the invention has been described with reference to the structure disclosed, other changes and modifications may be made within the spirit and scope of the present invention as defined in the following claims.

What I claim is:

1. An improved stylus for facsimile printing on an electroresistive recording medium, said stylus comprising an electrically conductive blank having a first conductive strip sandwiched between and bonded to second and third conductive foil strips, and at least three parallel wires electrically bonded to one end of said first strip with respective trans-versely aligned tips extending beyond one end of said blank to engage said recording medium; said second and third strips providing said stylus with a controlled damping characteristic when said tips are engaging said recording medium.

2. The stylus according to claim 1 wherein: said stylus includes an epoxy resin maintaining the longitudinal portions of the conductive wires together in a predetermined spatial relationship.

3. The stylus according to claim 2 wherein said conductive wires are made of iridium wires of about 5 mils in diameter and spaced from each other about one thousandths of an inch.

4. The stylus according to claim 3, wherein each of said iridium conductive wires is in a straight line and positioned in operation to form an angle between 13° and 17° from the normal to the surface of the recording medium for providing smooth tracking and optimal electrical and mechanical contact with the medium.

5. The stylus according to claim 1 wherein said first strip has an outer end bent at approximately a 45° angle with respect to an inner end thereof, said foil strips are bonded to opposite sides of said inner end, while said wires are bonded to said outer end.

* * * * *